(12) United States Patent
Kim et al.

(10) Patent No.: US 10,684,652 B2
(45) Date of Patent: Jun. 16, 2020

(54) FLEXIBLE DISPLAY DEVICE

(71) Applicant: LG Display Co., Ltd., Seoul (KR)

(72) Inventors: JeongHun Kim, Gyeonggi-do (KR); PyungYong Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/039,039

(22) Filed: Jul. 18, 2018

(65) Prior Publication Data

US 2019/0064881 A1 Feb. 28, 2019

(30) Foreign Application Priority Data

Aug. 30, 2017 (KR) .......................... 10-2017-0110339

(51) Int. Cl.
*G06F 1/16* (2006.01)
*G02F 1/1333* (2006.01)
*G02F 1/1335* (2006.01)
*G02F 1/1345* (2006.01)

(52) U.S. Cl.
CPC ........ *G06F 1/1652* (2013.01); *G02F 1/13452* (2013.01); *G02F 1/133305* (2013.01); *G02F 1/133308* (2013.01); *G02F 1/133528* (2013.01); *G02F 2001/133314* (2013.01); *G02F 2201/50* (2013.01)

(58) Field of Classification Search
CPC ............. G06F 1/1652; G06F 1/133308; G06F 1/133528; G06F 1/13452; G06F 1/133305; G02F 2201/50; G02F 2201/133314
See application file for complete search history.

(56) References Cited

U.S. PATENT DOCUMENTS

| | | | | |
|---|---|---|---|---|
| 7,027,110 | B2 * | 4/2006 | Akiyama | G02F 1/133305 349/58 |
| 7,791,279 | B2 * | 9/2010 | Kwon | H01J 5/48 313/582 |
| 8,576,555 | B2 * | 11/2013 | Misawa | G02F 1/133305 345/156 |
| 10,424,229 | B2 * | 9/2019 | Kim | G02F 1/133305 |
| 2007/0228952 | A1 * | 10/2007 | Kwon | H01J 5/48 313/580 |

(Continued)

FOREIGN PATENT DOCUMENTS

| | | |
|---|---|---|
| CN | 205721515 U | 11/2016 |
| JP | 2004-279867 A | 10/2004 |

(Continued)

*Primary Examiner* — Mihir K Rayan
(74) *Attorney, Agent, or Firm* — Seed Intellectual Property Law Group LLP

(57) ABSTRACT

A flexible display device. A plurality of back bars are attached to a rear surface of a display panel and a side cap coupled to the back bars while covering an edge of the display panel. A portion of a front surface of the display is provided adjacent to the edge. The flexible display device prevents edges of the display panel from being damaged, light from leaking through the edges, and the display panel from being scratched or damaged by friction during rolling of the display panel. The edges of an ultrathin display panel are protected from external impacts so that the edges are not damaged, and light leakage on the edges of the display panel is prevented. The display panel is prevented from being scratched or damaged while being rolled.

12 Claims, 9 Drawing Sheets

(56) References Cited

U.S. PATENT DOCUMENTS

| | | |
|---|---|---|
| 2011/0013112 A1 | 1/2011 | Yaguchi et al. |
| 2011/0043976 A1* | 2/2011 | Visser .................... G09F 9/00 361/679.01 |
| 2011/0273826 A1* | 11/2011 | Misawa ............ G02F 1/133305 361/679.01 |
| 2015/0378391 A1* | 12/2015 | Huitema ................ G06F 1/163 361/679.03 |

FOREIGN PATENT DOCUMENTS

| | | |
|---|---|---|
| JP | 2006-507543 A | 3/2006 |
| JP | 2006-509249 A | 3/2006 |
| JP | 2008-157996 A | 7/2008 |
| JP | 2011522299 A | 7/2011 |
| JP | 2015-228022 A | 12/2015 |
| KR | 10-2017-0064165 A | 6/2017 |
| KR | 10-2017-0095636 A | 8/2017 |
| TW | 200947373 A | 11/2009 |
| WO | 2004/047059 A1 | 6/2004 |

* cited by examiner

FLEXIBLE DISPLAY DEVICE

CROSS REFERENCE TO RELATED APPLICATION

This application claims priority to Korean Patent Application No. 10-2017-0110339, filed Aug. 30, 2017, which is hereby incorporated by reference for all purposes as if fully set forth herein.

BACKGROUND

Technical Field

The present disclosure relates to a display device and, more particularly, to a flexible display device able to provide a rollable or foldable display.

Description of Related Art

In general, research into flat panel display devices, such as liquid crystal display (LCD) devices, plasma display devices, field emission display devices, and organic light-emitting display devices, has been actively undertaken. Among such flat panel display devices, LCD devices and organic light-emitting display devices have recently come to prominence, due to advantages thereof, such as adaptability to mass production, easy implementation of driving units, as well as the ability thereof to realize high resolution.

Recently, research into, and development of, rollable and foldable display devices has been particularly required, in terms of technical aspects for overcoming the technical drawbacks of flat display devices, as well as structures able to have higher consumer appeal. A rollable display device of the related art, illustrated in FIG. 1, includes a display panel 110 and a roller 120, on which the display panel 110 is rolled.

However, in such a rollable display device, a display panel thereof, having an ultrathin structure so as to be rollable, is vulnerable to external impacts, which may damage edges of the display panel.

In addition, a side seal member must be provided on the edges of the display panel to prevent light from leaking through the edges. Since the display panel is configured to be ultrathin, the application of the side seal member may cause a polarizer film to become loose, be detached or unfastened from the display panel, or to create gaps therebetween, which is problematic.

In addition, during rolling of the display panel, portions of the display panel may rub against each other while being stacked on each other, so that the display panel may be scratched or damaged. Since this structure increases the necessity of repair, a significant amount of consumer complaints may be caused, which is problematic.

Accordingly, research into a flexible display device able to provide a rollable display or a foldable display without the above-described problems is necessary.

BRIEF SUMMARY

Various aspects of the present disclosure provide a flexible display device able to provide a rollable or foldable display. The flexible display device can protect edges of an ultrathin display panel from external impacts so that the edges are not damaged while preventing light leakage on the edges of the display panel.

Also provided is a flexible display device able to provide a rollable or foldable display. The flexible display device can prevent portions of the display panel from rubbing against each other while the portions are being stacked on each other, thereby preventing the display panel from being scratched or damaged.

The object of the present disclosure is not limited to the aforementioned description, and other objects not explicitly disclosed herein will be clearly understood by a person skilled in the art from the description provided hereinafter.

According to an embodiment of the present disclosure, a flexible display device may include: a display panel and a plurality of back bars attached to a rear surface of the display panel, with each of the back bars having opposing first and second ends positioned adjacent to or overlapping opposite edges of the display panel. A side cap is coupled to the back bars and covers an edge of the opposite edges of the display panel and a portion of a front surface of the display adjacent to the edge. The flexible display device can prevent edges of the display panel from being damaged, light from leaking through the edges, and the display panel from being scratched or damaged by friction during while being rolled.

According to exemplary embodiments, in the flexible display device able to provide a rollable display or a foldable display, edges of an ultrathin display panel can be protected from external impacts so that the edges are not damaged, and light leakage on the edges of the display panel can be prevented.

In addition, according to exemplary embodiments, in the flexible display device able to provide a rollable display or a foldable display, according to exemplary embodiments, portions of the display panel can be prevented from rubbing against each other while being stacked on each other, thereby preventing the display panel from being scratched or damaged.

BRIEF DESCRIPTION OF THE SEVERAL VIEWS OF THE DRAWINGS

The above and other objects, features, and advantages of the present disclosure will be more clearly understood from the following detailed description when taken in conjunction with the accompanying drawings, in which.

DETAILED DESCRIPTION

Figure 1:
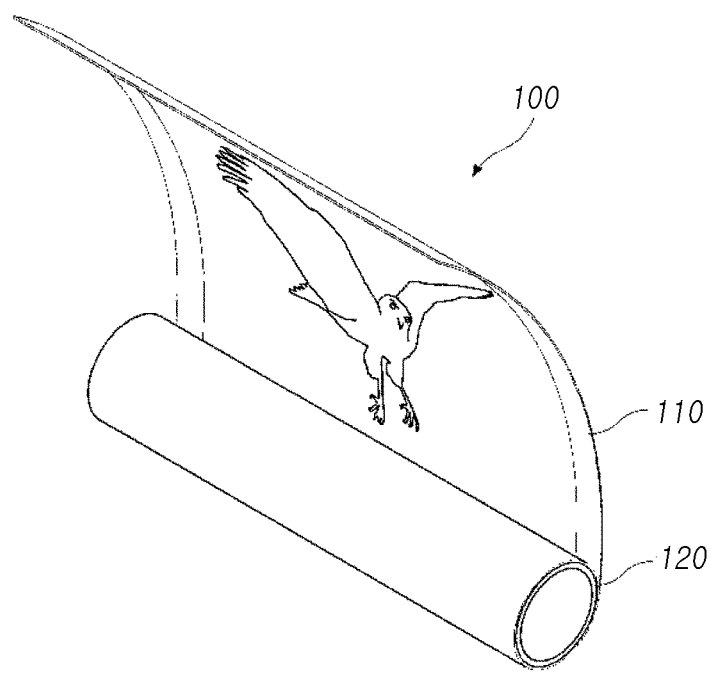
FIG. 1 is a perspective view schematically illustrating a rollable display device of the related art.

Hereinafter, reference will be made to embodiments of the present disclosure in detail, examples of which are illustrated in the accompanying drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

It will also be understood that, while terms such as "first," "second," "A," "B," "(a)," and "(b)" may be used herein to describe various elements, such terms are merely used to distinguish one element from other elements. The substance, sequence, order, or number of such elements is not limited by these terms. It will be understood that when an element is referred to as being "connected to" or "coupled to" another element, not only can it be "directly connected or coupled to" the other element, but it can also be "indirectly connected or coupled to" the other element via an "intervening" element. In the same context, it will be understood that when an element is referred to as being formed "on" or "under" another element, not only can it be directly located on or under another element, but it can also be indirectly located on or under another element via an intervening element.

Figure 2:
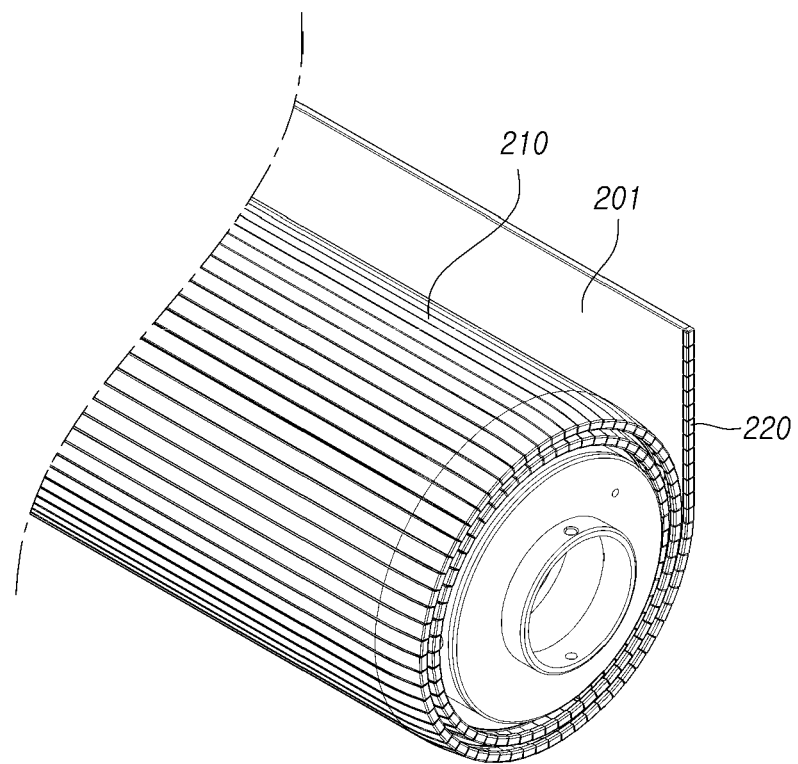
FIG. 2 is a perspective view illustrating a flexible display device according to one or more embodiments of the present disclosure.
Figure 3:
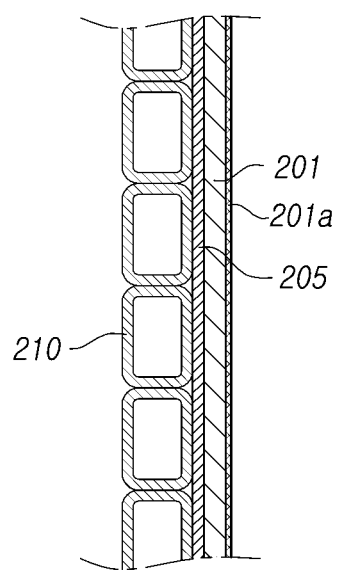
FIG. 3 is a cross-sectional view illustrating the flexible display device according to one or more embodiments.
Figure 4:
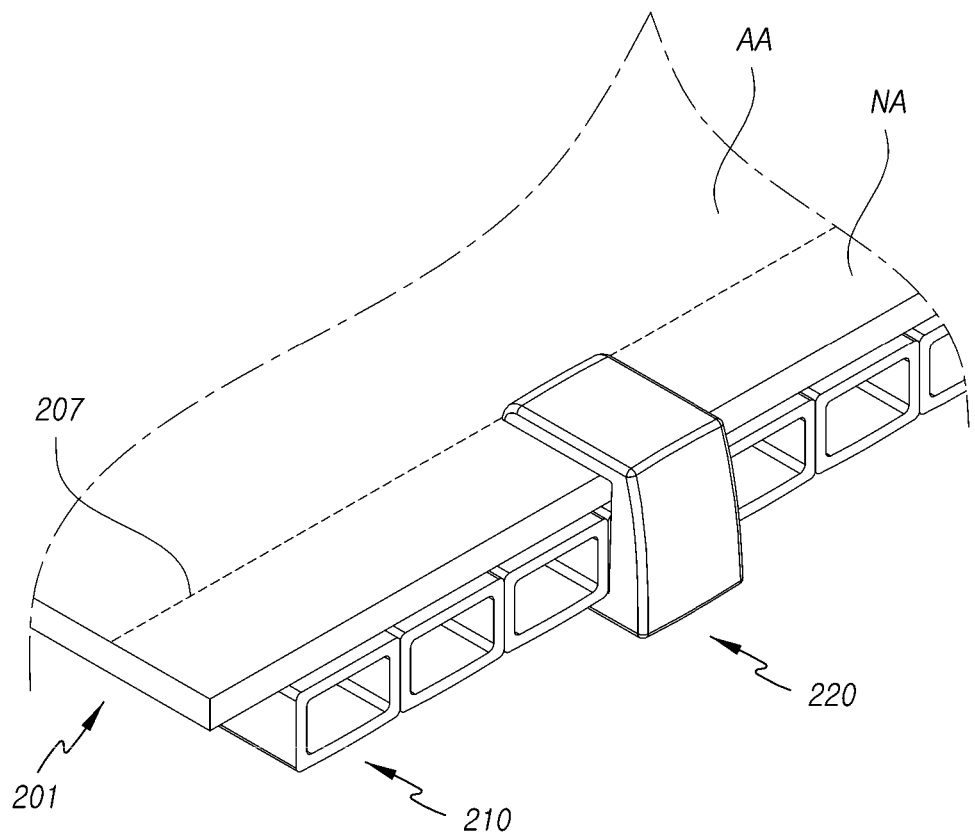
FIGS. 4 and 5 are perspective views illustrating portions of the flexible display device according to one or more embodiments.
Figure 5:
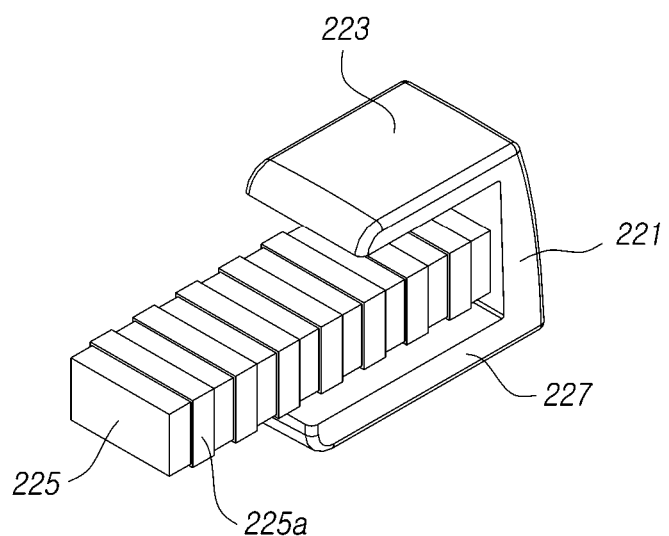
Figure 6:
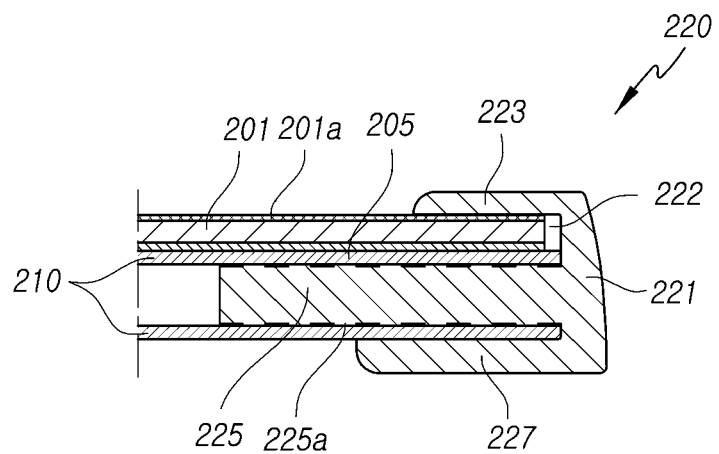
FIGS. 6 and 7 are cross-sectional views illustrating portions of the flexible display device according to one or more embodiments.
Figure 7:
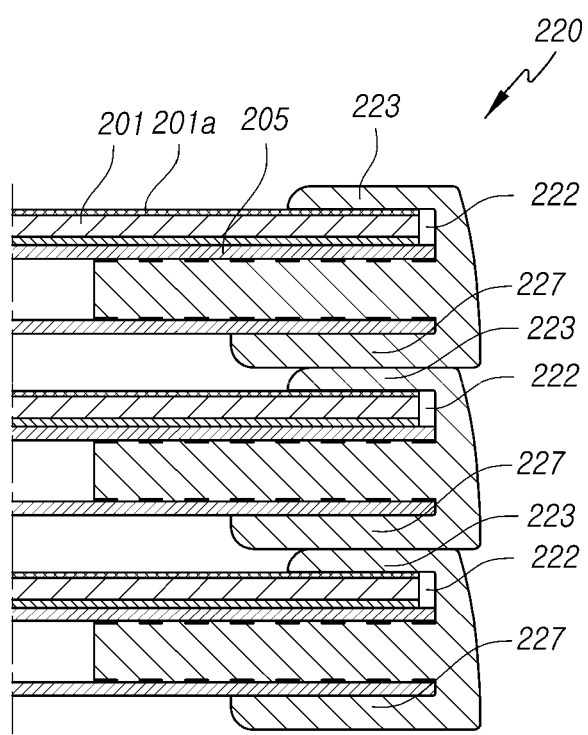
Figure 8:
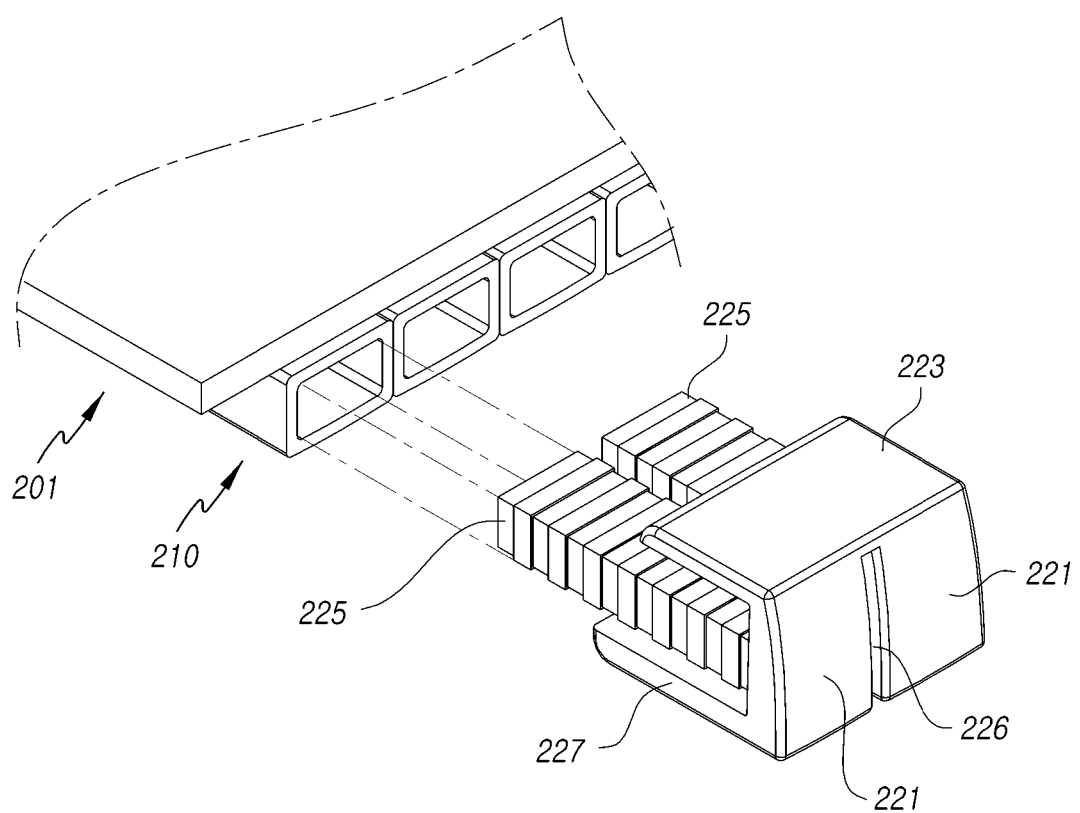
FIGS. 8 and 9 are perspective views illustrating portions of the flexible display device according to one or more embodiments.
Figure 9:
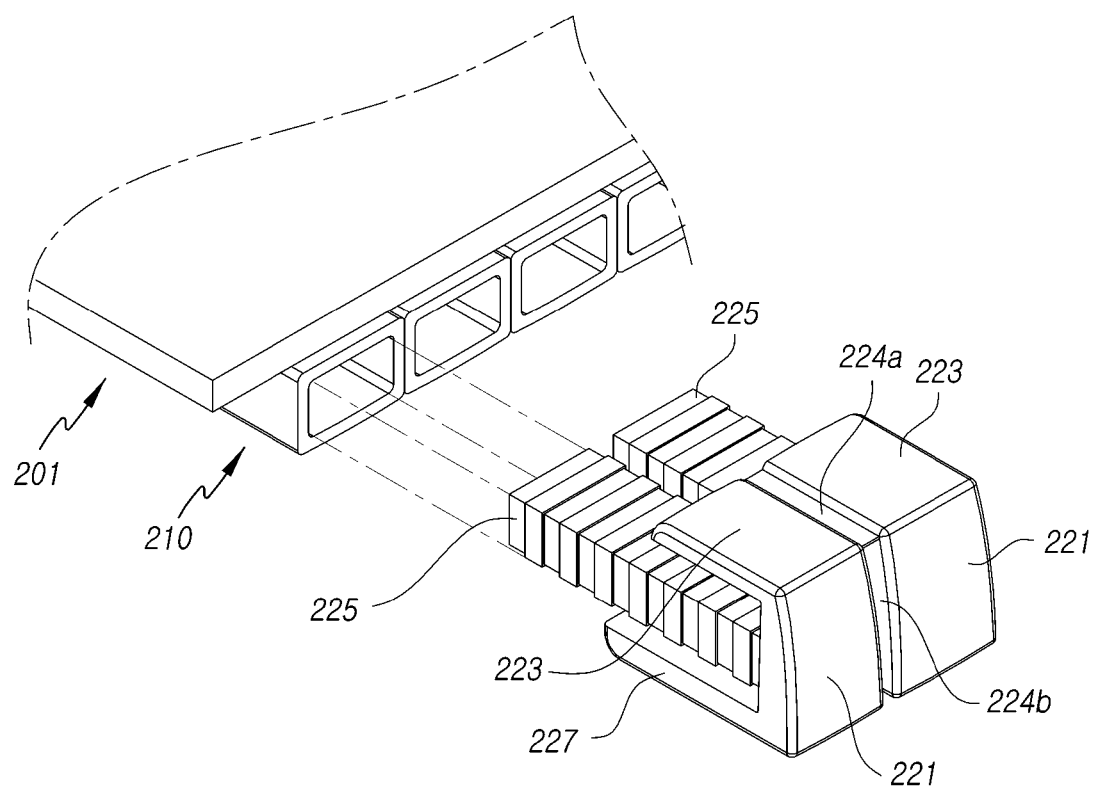

FIG. 2 is a perspective view illustrating a flexible display device according to exemplary embodiments, FIG. 3 is a cross-sectional view illustrating the flexible display device according to exemplary embodiments, FIGS. 4 and 5 are perspective views illustrating portions of the flexible display device according to exemplary embodiments, FIGS. 6 and 7 are cross-sectional views illustrating portions of the flexible display device according to exemplary embodiments, and FIGS. 8 and 9 are perspective views illustrating portions of the flexible display device according to exemplary embodiments.

As illustrated in the drawings, the flexible display device includes a display panel 201, a plurality of back bars 210, and a side cap 220. Each of the plurality of back bars 210 is attached to the rear surface of the display panel 201, with both ends thereof overlapping or being adjacent to a pair of edges of the display panel 201, respectively. The side cap 220 are coupled to the back bars 210 while covering at least one edge of the pair of edges of the display panel 201 and a portion of the front surface of the display panel 201 adjacent to the at least one edge.

Exemplary embodiments can provide a rollable display device in which the display panel 210 and the back bars 210 can be rolled and unrolled like a scroll or a foldable display device in which the display panel 210 and the back bars 210 can be folded at a predetermined angle. According to exemplary embodiments, a rollable display device in which the display panel 210 and the back bars 210 are rollable is illustrated by way of example.

The display device according to exemplary embodiments is a flexible display device that can provide a rollable display device or a foldable display device.

According to exemplary embodiments for providing a rollable display device or a foldable display device, the display panel 201 is applicable regardless of being as liquid crystal display (LCD) panel or a light-emitting display pane.

In the case that the display panel 201 is an LCD panel, the display panel 201 may further include a backlight unit illuminating the LCD panel, a bottom polarizer panel attached to a bottom substrate, and a top polarizer panel attached to the front surface of a top substrate. The bottom substrate and the top substrate may have a variety of specific configurations known in the art, depending on the driving mode of the LCD panel, such as twisted nematic (TN) mode, vertical alignment (VA) mode, in-plane switching (IPS) mode, and fringe field switching (FFS) mode.

In the case that the display panel 201 is a light-emitting display panel, the display panel 201 may include a top substrate including a plurality of light-emitting cells provided in areas defined by gate lines, data lines, and power (VDD) lines, respectively, and a top substrate facing and attached to the bottom substrate.

Each of the plurality of light-emitting cells provided on the bottom substrate may include: at least one switching transistor connected to a gate line and a data line; at least one driving transistor connected to a switching transistor and a power line; and a light-emitting device (e.g., an organic light-emitting diode (OLED)) emitting light in response to current controlled by the switching of the driving transistor. The top substrate may include a moisture absorbent material, or the like, to protect the light-emitting device from moisture or oxygen in the ambient air.

The top substrate may further include a light-emitting device connected to the driving transistor. In this case, the light-emitting device in the bottom substrate may be omitted.

According to exemplary embodiments, the display panel 201 is illustrated by way of example as being a light-emitting display panel. Since the light-emitting display panel 201 is configured to irradiate light by itself, the backlight unit emitting light is not illustrated. Hereinafter, the display panel 201 will be described as being a light-emitting display panel.

An organic compound contained in an array of pixels of the light-emitting display panel may be deteriorated when exposed to moisture or oxygen. To prevent the problem of deteriorated pixels, an encapsulation member 201*b* may be bonded to the rear surface of the display panel 201 to seal the array of pixels.

A polarizer film 201*a* may be bonded to the front surface of the display panel 201.

In addition, to prevent light emitted by the array of pixels from leaking through the edges, a side seal member made of a polymer material having a black pigment added thereto must be provided on the edges of the display panel 201. Since the display panel 201 according to exemplary embodiments is a flexible display panel able to provide a rollable display or a foldable display, the display panel 201 is configured to be ultrathin. Thus, the application of the side seal member may cause a polarizer film to come loose from the display panel or create air gaps.

Accordingly, the side cap 220 is coupled to the back bars 210 while covering the edges and portions of the front surface of the display panel 201 to prevent light leakage and prevent defects, in which the polarizer film 201*a* may come loose from the display panel 201 or voids may be crated between the polarizer film 201*a* and the display panel 201.

In addition, a plurality of flexible circuit films having driving integrated circuits (ICs) mounted thereon are electrically connected to the display panel 201 and a printed circuit board (PCB), on at least one portion of the rectangular rear surface of the display panel 201, adjacent to at least one edge of the display panel 201.

The plurality of flexible circuit films are attached to the display panel 201 and the PCB via a resin or the like by tape automated bonding (TAB). The plurality of flexible circuit films may be tape carrier packages (TCPs) or chip-on-flexible boards or chip-on-films (COFs).

Thus, the display panel 201 is electrically connected or joined to the PCB via the plurality of flexible circuit films. The PCB is electrically connected to the plurality of flexible circuit films to provide a variety of image display signals to the display panel 201.

The PCB is electrically connected to the plurality of flexible circuit films to provide a variety of image display signals to the display panel 201. Driving ICs or the like for controlling the driving of the display panel 201 are mounted on the PCB.

In addition, in the plurality of back bars 210 attached to the rear surface of the display panel 201, both ends thereof are disposed to overlap or be adjacent to the edges of the display panel 201. That is, each of the plurality of back bars 210 has opposing first and second ends, and the back bars 210 extend across the rear surface of the display panel 201, with the first and second ends positioned adjacent to or overlapping opposite edges (e.g., a left side edge and a right side edge) of the display panel 210. According to this configuration, the plurality of back bars 210 can support the display panel 201 so that the display panel 201 can be rolled or folded at a predetermined angle.

An adhesive member 205 may be provided between and bonded to the front surfaces of the back bars 210 and the rear surface of the display panel 201 to prevent the back bars 210 from moving when pushed. The adhesive member 205 may be double-sided tape, adhesive heat conductive tape, or the like.

The side cap 220 includes a side support 221, inserts 225, and a front support 223. The side support 221 covers the edge of the display panel 201. The insert 225 is fitted into a back bar 210, among the plurality of back bars 210, corresponding thereto. The front support 223 is located on the front surface of the edge of the display panel 201. The side cap 220 can protect end portions of the back bars 210 and the edge of the display panel 201, and can prevent light from leaking through the edge of the display panel 201.

In addition, each of the back bars 210 has a hollow rectangular cross-section, such that the inserts 225 of the side cap 220 can be inserted and fitted into the back bars 210, respectively.

As illustrated in FIG. 5, the insert 225 has one or more protrusions 225a on the outer surface thereof. The protrusions 225a, protruding from the outer surfaces of the insert 225, are elastically deformed while being pressed against the inner surfaces of the back bar 210 when being fitted into the back bar 210. This can consequently maintain strong fixing force while preventing the side cap 220 from being detached from the back bar 210.

In addition, as illustrated in FIG. 5, the side cap 220 may further include a rear support 227 bent from an inner portion of one end of the side support 221 to be spaced apart from the insert 210 and support the rear surface of the back bar 210. The rear support 227 extends inwardly from one end (e.g., a lower or rear end) of the side support 221. According to this configuration, the side cap 220 can protect the end portion of the back bar 210 and the edge of the display panel 201. When the display device is rolled, as illustrated in FIG. 7, the front support 223 and the rear support 227 are located between the portions of the display panel 201 to prevent the portions of the display panel 201 from colliding or rubbing against each other, so that the display panel 201 is neither scratched nor damaged.

As illustrated in FIG. 4, the distal end of the front support 223 may extend to a boundary portion 207 of an active area AA and a non-active area NA of the display panel 201. That is, the front support 223 extends from an end (e.g., an upper or front end) of the side support 221 to the boundary 207 between the active area AA and the non-active area NA. Since the distal end of the front support 223 extends to the boundary portion 207 between the active area AA and the non-active area NA, the non-active area NA of the display panel 201 is covered by the front support 223 of the side cap 220, so that a user may feel as if the bezel is reduced.

In addition, the side cap 220 has a grooved panel seat 222 between the inserts 225 and the front support 223, such that the edge of the display panel 201 is seated in the grooved panel seat 222. When the back bars 210 and the side cap 220 are coupled to each other, strong fixing force can be maintained therebetween, and an extent to which the side cap 220 protrudes beyond the edge of the display panel 201 can be reduced, thereby providing an aesthetic appearance.

In addition, the back bars 210 and the side cap 220 may be coupled such that hollow spaces are provided between the grooved panel seats 222 and the edge of the display panel 201. Consequently, even in the case in which external impacts are applied to the display panel 201, this configuration can prevent the edge of the display panel 201 from being damaged.

As illustrated in FIGS. 8 and 9, two or more inserts 225 may be spaced apart from each other, edges of two or more front supports 223 may be connected to each other, and edges of two or more side supports 221 may be connected to each other, so as to be coupled to two or more adjacent back bars 210. As described above, a single side cap 220 is configured to be coupled to the two or more back bars 210. This configuration can reduce the number of parts and simplify assembly processing.

Specifically, the inserts 225, configured to be fitted into the back bars 210, are spaced apart from each other by the same distance as the back bars 210. Each front support 223 and each side support 221 may be configured to be connected to an adjacent front support 223 and an adjacent side support 221. In FIGS. 8 and 9, a structure coupled to two back bars 210 is illustrated by way of example.

As illustrated in FIG. 8, the side cap 220 may have an elastically-deformable groove 226 recessed in an outer side surface of the side support 221. When the display panel 201 is rolled or folded, the thin elastically-deformable groove 226, provided in the outer side surface of the side support 221, can be elastically deformed to be stretched or shrunk, so that the display panel 201 can be easily rolled or folded. When the display panel 201 is rolled, a curvature at which portions of the display panel 201 is stacked can also be reduced, thereby reducing a volume of the rolled display panel.

The elastically-deformable groove 226 is provided in a position corresponding to a joint between the back bars 210, thereby imparting elastic deformability to a portion that is most frequently deformed. Consequently, elastic deformation can be efficiently undertaken.

In addition, when the edges of the adjacent front supports 223 and the edges of the adjacent side supports 221 are connected so as to be coupled to two back bars 210, a connector rib 224a and a connector rib 224b may be provided in a joint between the front supports 223 and a joint between the side supports 221, respectively, as illustrated in FIG. 9. Alternatively, two or more connector ribs 224a and connector rib 224b may be provided to connect three or more front supports 223 and side supports 221, such that the three or more front supports 223 and side supports 221 can be coupled to three or more back bars 210. According to the configuration illustrated in FIG. 9, the connector rib 224a is thinner than the front supports 223, and the connector rib 224b is thinner than the side supports 221.

When the display panel 201 is rolled or folded, the connector ribs 224a and 224b, provided between the front supports 223 of the side cap 220, can be elastically deformed, i.e., stretched or shrunk, thereby facilitating rolling or folding.

The connector ribs 224a and 224b are provided in positions corresponding to joints of the back bars 210, thereby imparting elastic deformability to portions that are most frequently deformed. Consequently, elastic deformation can be efficiently undertaken.

According to exemplary embodiments, the display panel has been illustrated as being a light-emitting display panel in the drawings. However, as described above, exemplary embodiments are applicable to LCD display panels. In this case, a backlight module illuminating the LCD panel includes a light source module, a lightguide plate processing light, emitted by the light source module, to be suitable for the LCD panel, a light adjustment member, a reflector, and the like. The light source module is a part converting electrical energy into light. The light source module may be implemented as one selected from among, but not limited to, a light-emitting diode (LED) assembly, a cold cathode fluorescent lamp (CCFL), and a hot cathode fluorescent lamp (HCFL). Since the light source module is well known in the art to which exemplary embodiments belong, detailed descriptions thereof will be omitted.

As set forth above, in the flexible display device able to provide a rollable display or a foldable display, according to exemplary embodiments, edges of an ultrathin display panel can be protected from external impacts so that the edges are not damaged, and light leakage on the edges of the display panel can be prevented.

In addition, in the flexible display device able to provide a rollable display or a foldable display, according to exemplary embodiments, portions of the display panel can be prevented from rubbing against each other while being stacked on each other, thereby preventing the display panel from being scratched or damaged.

Although all of the components constituting exemplary embodiments have been described as being combined together or as operating in concert with each other, the present disclosure is not necessarily limited thereto. Rather, one or more components may be selected from the entire components to be combined together and operate in a combined form within the scope of the present disclosure.

It will be understood that the terms "comprise," "include," "have," and any variations thereof used herein are intended to cover non-exclusive inclusions unless explicitly described to the contrary. Unless otherwise defined, all terms including technical and scientific terms used herein have the same meaning as commonly understood by a person skilled in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The foregoing descriptions and the accompanying drawings have been presented in order to explain the certain principles of the present disclosure. A person skilled in the art to which the present disclosure relates could make many modifications and variations by combining, dividing, substituting for, or changing the elements without departing from the principle of the present disclosure. The foregoing embodiments disclosed herein shall be interpreted as illustrative only but not as limitative of the principle and scope of the present disclosure. It should be understood that the scope of the present disclosure shall be defined by the appended claims and all of their equivalents fall within the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A flexible display device, comprising:
a display panel;
a plurality of back bars attached to a rear surface of the display panel, each of the back bars having opposing first and second ends positioned adjacent to or overlapping opposite edges of the display panel; and
a side cap coupled to the back bars, the side cap covering an edge of the opposite edges of the display panel and a portion of a front surface of the display panel adjacent to the edge,
wherein the back bars are hollow, and the side cap is inserted and fitted into the back bars.

2. The flexible display device according to claim 1, further comprising an adhesive member between the rear surface of the display panel and front surfaces of the back bars.

3. The flexible display device according to claim 2, wherein
the side cap comprises:
a side support covering the edge of the display panel and the first ends or the seconds ends of the back bars,
inserts fitted into the back bars, and
a front support positioned on a front surface of the display panel adjacent to the edge.

4. The flexible display device according to claim 3, wherein each of the inserts comprises a protrusion protruding from an outer surface thereof, the protrusion configured to be elastically deformed while being pressed against an inner surface of a respective back bar of the plurality of back bars.

5. The flexible display device according to claim 3, wherein the side cap further comprises a rear support extending from one end of the side support, the rear support being spaced apart from the inserts and configured to support rear surfaces of the back bars.

6. The flexible display device according to claim 3, wherein the front support extends to a boundary portion between an active area and a non-active area of the display panel.

7. The flexible display device according to claim 3, wherein the side cap further comprises a grooved panel seat between the inserts and the front support, the edge of the display panel being seated in the grooved panel seat.

8. The flexible display device according to claim 3, wherein the side cap comprises:
two or more inserts disposed adjacently to each other,
two or more front supports, edges of adjacent front supports being connected to one another, and
two or more side supports, edges of adjacent side supports being connected to one another, the side cap being coupled to two or more of the back bars.

9. The flexible display device according to claim 8, wherein the side cap further comprises an elastically-deformable groove recessed in an outer side surface of the side support.

10. The flexible display device according to claim 9, wherein the elastically-deformable groove is provided in a position corresponding to a joint between the two or more of the back bars.

11. The flexible display device according to claim 8, wherein the side cap further comprises connector ribs in joints between the edges of the front supports and between the edges of the side supports, the connector ribs being thinner than the front supports and the side supports.

12. The flexible display device according to claim 11, wherein the connector ribs are provided in a position corresponding to a joint between the two or more of the back bars.

\* \* \* \* \*